United States Patent
Aoki

(10) Patent No.: US 10,021,432 B2
(45) Date of Patent: Jul. 10, 2018

(54) TIME SERIES DATA ENCODING APPARATUS, METHOD, AND PROGRAM, AND TIME SERIES DATA RE-ENCODING APPARATUS, METHOD, AND PROGRAM

(71) Applicant: NEC Corporation, Minato-ku, Tokyo (JP)

(72) Inventor: Hirofumi Aoki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 14/888,505

(22) PCT Filed: Apr. 11, 2014

(86) PCT No.: PCT/JP2014/002084
§ 371 (c)(1),
(2) Date: Nov. 2, 2015

(87) PCT Pub. No.: WO2014/196113
PCT Pub. Date: Dec. 11, 2014

(65) Prior Publication Data
US 2016/0094862 A1  Mar. 31, 2016

(30) Foreign Application Priority Data
Jun. 6, 2013  (JP) .................... 2013-119853

(51) Int. Cl.
*H04N 21/234* (2011.01)
*H04N 19/46* (2014.01)
(Continued)

(52) U.S. Cl.
CPC ..... *H04N 21/23406* (2013.01); *H04N 19/127* (2014.11); *H04N 19/152* (2014.11);
(Continued)

(58) Field of Classification Search
CPC .. H04N 19/172; H04N 19/127; H04N 19/423; H04N 19/46; H04N 21/2405;
(Continued)

(56) References Cited

U.S. PATENT DOCUMENTS

| | | | |
|---|---|---|---|
| 7,359,324 B1* | 4/2008 | Ouellette | H04L 43/087 370/230 |
| 8,229,000 B2* | 7/2012 | Ito | H04N 21/233 375/240.12 |
| 2011/0299588 A1* | 12/2011 | Zhou | H04N 21/2401 375/240.02 |

FOREIGN PATENT DOCUMENTS

| | | |
|---|---|---|
| JP | 11355230 A | 12/1999 |
| JP | 4023451 B | 6/2004 |

(Continued)

OTHER PUBLICATIONS

Jordi Ribas-Cobera, Philip A.Chou, Shankar L. Regunathan, "A Generalized Hypothetical Reference Decoder for H.264/AVC," IEEE Transactions on Circuits and Systems for Video Technology., p. 674, volume. 13, No. 7, Jul. 2003, Cited in the Specification.
(Continued)

*Primary Examiner* — Chenea Smith

(57) ABSTRACT

A time series data encoding apparatus includes a time series data encoding means 11 for compressing and encoding time series data thereby to generate encoded bit streams, a virtual buffer 12 for calculating a transition of the amount of data accumulated in a buffer in a virtual decoder defined according to an encoding system, a buffer usage analyzing means 13 for analyzing the transition of the amount of accumulated data thereby to reset parameters indicating a size of the buffer and the amount of accumulated data in the buffer at a predetermined time, and a multiplexing means 14 for multiplexing the encoded bit streams generated by the time
(Continued)

series data encoding means 11 and the parameters reset by the buffer usage analyzing means 13.

9 Claims, 8 Drawing Sheets

(51) Int. Cl.
| | |
|---|---|
| *H04N 19/152* | (2014.01) |
| *H04N 19/172* | (2014.01) |
| *H04N 19/127* | (2014.01) |
| *H04N 19/423* | (2014.01) |
| *H04N 21/236* | (2011.01) |
| *H04N 21/2383* | (2011.01) |
| *H04N 21/24* | (2011.01) |

(52) U.S. Cl.
CPC ......... *H04N 19/172* (2014.11); *H04N 19/423* (2014.11); *H04N 19/46* (2014.11); *H04N 21/2383* (2013.01); *H04N 21/23605* (2013.01); *H04N 21/23608* (2013.01); *H04N 21/2405* (2013.01)

(58) Field of Classification Search
CPC ....... H04N 21/23406; H04N 21/23605; H04N 21/23608; H04N 21/2383; H04N 19/152
See application file for complete search history.

(56) References Cited

FOREIGN PATENT DOCUMENTS

| | | |
|---|---|---|
| JP | 4264535 B | 8/2004 |
| JP | 2006519517 A | 8/2006 |
| JP | 2010278815 A | 12/2010 |
| JP | 2011211691 A | 10/2011 |

OTHER PUBLICATIONS

ISO/IEC 14496-10 Advanced Video Coding, "Annex E Video usability information", 2012, Cited in the Specification.
International Search Report for PCT Application No. PCT/JP2014/002084, dated Aug. 7, 2014.

* cited by examiner

TIME SERIES DATA ENCODING APPARATUS, METHOD, AND PROGRAM, AND TIME SERIES DATA RE-ENCODING APPARATUS, METHOD, AND PROGRAM

This application is a National Stage Entry of PCT/JP2014/002084 filed on Apr. 11, 2014, which claims priority from Japanese Patent Application: 2013-119853 filed on Jun. 6, 2013, the contents of all of which are incorporated herein by reference, in their entirety.

TECHNICAL FIELD

The present invention relates to a technique for encoding time series data such as videos, and particularly to a time series data encoding apparatus capable of reducing a buffer size and a transmission delay during transmission, a time series data re-encoding apparatus, a time series data encoding method, a time series data re-encoding method, a time series data encoding program, and a time series data re-encoding program.

BACKGROUND ART

Compression encoding is often applied to accumulate and transmit video data as a time series collection of image frames in order to restrict an accumulation capacity or transmission path band. Variable length encoding is typically used for the compression encoding. Thus, the amount of data per frame in a compressed data string (which will be called bit stream hereinafter) is not constant. Since the amount of exchanged data per unit time varies independent of a property of a transmission path in a system for transmitting and processing such bit streams in real-time, there is a problem that stable transmission cannot be performed. In order to solve such a problem, there is generally employed a method for smoothing the amount of data per unit time flowing in the transmission path and adjusting it to the property of the transmission path by providing a buffer behind an encoder and in front of a decoder.

FIG. 7 is a block diagram illustrating an exemplary system including a video encoding/sending apparatus and a video decoding apparatus. In the system illustrated in FIG. 7, a video encoding/sending apparatus 710 compresses and encodes an input video in real-time. The video encoding/sending apparatus 710 then transmits data (bit streams) to a video decoding apparatus 720 via a buffer. The video decoding apparatus 720 decodes the data received from the video encoding/sending apparatus 710 in real-time to be output as a video.

The video encoding/sending apparatus 710 includes an encoder 711 and a transmission buffer 712. The encoder 711 sequentially compresses and encodes image frames configuring the input video thereby to generate bit streams, and supplies the generated bit streams to the transmission buffer 712. The transmission buffer 712 outputs the supplied bit streams at a predetermined transfer speed (bit rate) while accumulating the supplied bit streams. The bit streams output from the video encoding/sending apparatus 710 are supplied to the video decoding apparatus 720 via a network, for example.

The video decoding apparatus 720 includes a reception buffer 721 and a decoder 722. The reception buffer 721 cuts out data per frame while accumulating the bit streams input at a predetermined bit rate. The reception buffer 721 then supplies the cut data to the decoder 722 at a predetermined timing. The decoder 722 sequentially decodes the supplied bit streams thereby to generate image frames, and outputs the generated image frames as a video.

Videos may be selectively transmitted and processed from many previously-accumulated video contents. In such a case, in order to reduce a storage capacity of a storage for accumulating the video contents or computation cost of the compression encoding processing during transmission, there is employed a system for previously compressing and encoding, and accumulating input videos offline and for transmitting the accumulated videos in response to a request from the reception side. Also in this case, a buffer needs to be provided behind the encoder and in front of the decoder in order to perform stable transmission.

FIG. 8 is a block diagram illustrating an exemplary system including a video encoding apparatus, a video sending apparatus, and a video decoding apparatus. In the system illustrated in FIG. 8, a video encoding apparatus 810 compresses and encodes an input video, and accumulates it in a storage (storage device 820), and then a video sending apparatus 830 transmits data (bit streams) to a video decoding apparatus 840 via a buffer. The video decoding apparatus 840 decodes and outputs the received data as a video.

The video encoding apparatus 810 sequentially compresses and encodes image frames configuring the input video thereby to generate bit streams, and accumulates the generated bit streams in the storage device 820.

The video sending apparatus 830 includes a sender 831 and a transmission buffer 832. The sender 831 extracts the bit streams accumulated in the storage device 820, and supplies the extracted bit streams to the transmission buffer 832. The transmission buffer 832 outputs the supplied bit streams at a predetermined bit rate while accumulating the supplied bit streams. The bit streams output from the video sending apparatus 830 are supplied to the video decoding apparatus 840 via a network, for example.

The video decoding apparatus 840 includes a reception buffer 841 and a decoder 842. The reception buffer 841 cuts out data per frame while accumulating the bit streams input at a predetermined bit rate. The reception buffer 841 then supplies the cut data to the decoder 842 at a predetermined timing. The decoder 842 sequentially decodes the supplied bit streams thereby to generate image frames, and outputs the generated image frames as a video.

In this way, in the video transmission system including the transmission buffer and the reception buffer, the video encoding apparatus needs to perform encoding in order to prevent overflow or underflow in the buffer in the video decoding apparatus. Thus, the video encoding apparatus uses a virtual buffer simulating the operations of the reception buffer in the video decoding apparatus to perform the compression encoding processing while monitoring the virtual buffer. Specifically, when performing the compression encoding processing, the video encoding apparatus adjusts a compression rate of each image frame in order to prevent overflow and underflow in the virtual buffer.

A model of the virtual buffer is defined depending on a video compression encoding system. For example, if the ISO/IEC 13818-2 MPEG-2 system and the ISO/IEC 14496-2 MPEG-4 Part 2 system are employed for the video compression encoding system, the VBV (Video Buffering Verifier) buffer model is defined as a virtual buffer model. Further, for example, if the ISO/IEC 14496-10 MPEG-4 AVC/H.264 system is employed for the video compression encoding system, the CPB (Coded Picture Buffer) model in a virtual decoder HRD (Hypothetical Reference Decoder) is defined as a virtual buffer model. The virtual buffer models are described in detail in NPL 1, for example.

The representative operations of the virtual buffer will be described below with reference to FIG. 9 and FIG. 10. The operations of the video encoding apparatus for controlling the virtual buffer based on previously-defined operation parameters of the virtual buffer will be specifically described.

FIG. 9 is an explanatory diagram illustrating the amounts of generated codes per image frame in a bit stream obtained from a compressed and encoded video by way of example. FIG. 10 is an explanatory diagram illustrating an exemplary transition of the buffer occupancy amount in the virtual buffer simulating the reception buffer for inputting the bit streams.

The virtual buffer has a preset buffer size Bmax. The virtual buffer keeps on increasing the buffer occupancy amount in the virtual buffer at a predetermined bit rate R until a predetermined time Dinit is reached. When the time Dinit is reached, the virtual buffer subtracts the amount of codes A(0) in a group of data corresponding to an image frame with the frame number 0 from the buffer occupancy amount. The processing corresponds to a processing of supplying the group of data of the frame from the reception buffer to the decoder in the actual video decoding apparatus. Assuming the time as t(0) and a reproduction time interval between image frames in the video as f, the virtual buffer keeps on increasing the buffer occupancy amount in the virtual buffer at the predetermined bit rate R again until time t(1) defined in the following Equation (1) is reached. The video encoding apparatus then subtracts the amount of codes A(1) in the group of data corresponding to an image frame with the frame number 1 from the buffer occupancy amount at time t(1).

$$t(k+1)=t(k)+f \quad \text{Equation (1)}$$

Subsequently, the virtual buffer repeatedly performs the processing of subtracting the amount of codes A(k) in the group of data corresponding to an image frame with the frame number k from the buffer occupancy amount at time t(k) while increasing the buffer occupancy amount in the virtual buffer at the predetermined bit rate R.

The bit rate R, the buffer size Bmax, and the decoding start delay time Dinit in the group of parameters are generally determined before the start of the encoding processing depending on an image quality request, a delay request, a property of the transmission path, or the like, and are transmitted to the video decoding apparatus together with bit streams. An initial buffer occupancy amount Binit obtained in the following Equation (2) may be transmitted instead of the decoding start delay time Dinit. There is, as the transmission method, a method for encoding these information as auxiliary information, and multiplexing and transmitting the auxiliary information on bit streams, which conforms to the rules described in NPL 2, for example.

$$Binit=Dinit \times R \quad \text{Equation (2)}$$

FIG. 11 is a block diagram illustrating an exemplary structure of a typical video encoding apparatus for encoding while monitoring the operations of the virtual buffer.

The video encoding apparatus illustrated in FIG. 11 includes a video encoder 911, a virtual buffer 912, and a multiplexer 913.

The video encoder 911 encodes each image frame configuring input data (input video) thereby to generate video bit streams while monitoring the operations of the virtual buffer 912. The video encoder 911 then supplies the generated video bit streams to the multiplexer 913, and supplies the amount of generated codes to the virtual buffer 912.

The virtual buffer 912 calculates the buffer occupancy amount at each instant of time based on buffer setting information including the buffer size or the delay amount, and the amount of generated codes supplied from the video encoder 911. The virtual buffer 912 feeds back the calculation result to the video encoder 911.

The multiplexer 913 encodes the buffer setting information as auxiliary information, multiplexes the encoded buffer setting information on the video bit streams supplied from the video encoder 911, and outputs the multiplexed video bit streams as bit streams.

As described above, in the system for performing transmission via the transmission buffer and the reception buffer illustrated in FIG. 7 and FIG. 8, even if the amount of data per unit time in a bit stream varies, the variation can be absorbed by the buffer. Therefore, the video decoding apparatus can decode the bit streams transmitted at the predetermined bit rate without corruption, and can output the decoded bit streams as a video. When a video is transmitted in the system, however, a delay corresponding to Dinit indicated in FIG. 10 occurs. A delay in the video transmission causes a deterioration in interactive property, such as non-smooth switching of reception channels in TV broadcasting. Therefore, the transmission delay is required to be as small as possible in the system for performing transmission via the transmission buffer and the reception buffer.

CITATION LIST

Patent Literatures

PLT 1: JP 4264535 B2
PLT 2: JP 4023451 B2

Non Patent Literatures

NPL 1: Jordi R.-C, Philip A. C, Shankar L. R, "A Generalized Hypothetical Reference Decoder for H.264/AVC," IEEE Trans. CSVT, vol. 13, no. 7, July. 2003
NPL 2: ISO/IEC 14496-10 Advanced Video Coding, "Annex E Video usability information"

SUMMARY OF INVENTION

Technical Problem

As illustrated in FIG. 8, however, there is also present the system in which the video encoding apparatus accumulates a compressed and encoded input video in the storage and then transmits the accumulated video to the video decoding apparatus via the buffer and the video decoding apparatus decodes the received data in real-time and outputs the decoded data as a video. In the system, the transmission delay is defined based on the operation setting previously determined before the start of the encoding processing, such as Dinit. That is, in the system, the transmission delay is determined depending on the operation setting when the bit streams are generated and accumulated in the storage device by the video encoding apparatus, and thus the transmission delay cannot be reduced any more.

When the compression encoding processing is performed while the buffer operation is being monitored, the amount of codes generated by compressing and encoding each image frame cannot be accurately known prior to the compression encoding processing. Thus, the video encoding apparatus needs to control to prevent underflow and overflow based on the predicted amount of codes. Such a control technique is disclosed in PTL 1, for example. With the technique described in PTL 1, there is controlled such that upper limit and lower limit margins are provided for the upper limit (Bmax indicated in FIG. 10, for example) and the lower limit (0, for example) of the virtual buffer and the buffer occupancy amount is prevented from exceeding the upper limit margin and lowering the lower limit margin. The video encoding apparatus performs such control, thereby accurately avoiding underflow and overflow in the buffer. On the other hand, strictly, the buffer occupancy amount does not reach the upper limit and the lower limit of the buffer. A variation in the amount of generated codes per unit time in each bit stream is small due to the property of the input video, and consequently the buffer occupancy amount may not reach the determined upper limit and lower limit of the buffer. Therefore, with the technique described in PTL 1, there are problems that the buffer size required for transmission is useless and an unwanted transmission delay is caused.

On the other hand, as another means for performing transmission with the reduced delay amount, there is assumed that previously-created bit streams are temporarily decoded as a video and then compression encoding is performed again according to the predetermined buffer size and the delay amount. For example, PTL 2 describes therein a technique for re-compressing and encoding bit streams as a compressed video. However, when the re-compression encoding processing is performed by use of the technique described in PTL 2, the video decoding processing and the compression encoding processing are required, and thus there is a problem that the computation amount for the processings increases. Further, the temporarily-compressed video is re-compressed, and thus there is another problem that a deterioration in image quality is caused.

It is therefore an object of the present invention to provide a time series data encoding apparatus capable of reducing a buffer size required for transmission and a transmission delay without performing a re-compression processing on time series data when transmitting compressed and encoded time series data, a time series data re-encoding apparatus, a time series data encoding method, a time series data re-encoding method, a time series data encoding program, and a time series data re-encoding program.

Solution to Problem

A time series data encoding apparatus according to the present invention includes a time series data encoding means which compresses and encodes time series data thereby to generate encoded bit streams, a virtual buffer which calculates a transition of the amount of data accumulated in a buffer in a virtual decoder defined according to an encoding system, a buffer usage analyzing means which analyzes the transition of the amount of accumulated data thereby to reset parameters indicating a size of the buffer and the amount of accumulated data in the buffer at a predetermined time, and a multiplexing means which multiplexes the encoded bit streams generated by the time series data encoding means and the parameters reset by the buffer usage analyzing means.

A time series data re-encoding apparatus according to the present invention includes a demultiplexing means which demultiplexes encoded bit streams including operation parameters of a buffer in a virtual decoder defined according to an encoding system, a code amount detecting means which calculates the amount of data per predetermined time in the demultiplexed time series data bit streams, a virtual buffer which calculates a transition of the amount of data accumulated in the buffer, a buffer usage analyzing means which analyzes the transition of the amount of accumulated data thereby to reset parameters indicating a size of the buffer and the amount of accumulated data in the buffer at a predetermined time, and a multiplexing means which multiplexes the demultiplexed time series data bit streams and the parameters reset by the buffer usage analyzing means.

A time series data encoding method according to the present invention includes: compressing and encoding time series data thereby to generate encoded bit streams, calculating a transition of the amount of data accumulated in a buffer in a virtual decoder defined according to an encoding system, analyzing the transition of the amount of accumulated data thereby to reset parameters indicating a size of the buffer and the amount of accumulated data in the buffer at a predetermined time, and multiplexing the generated encoded bit streams and the reset parameters.

A time series data re-encoding method according to the present invention includes: demultiplexing encoded bit streams including operation parameters of a buffer in a virtual decoder defined according to an encoding system, calculating the amount of data per predetermined time in the demultiplexed time series data bit streams, calculating a transition of the amount of data accumulated in the buffer in the virtual decoder, analyzing the transition of the amount of accumulated data thereby to reset parameters indicating a size of the buffer and the amount of accumulated data in the buffer at a predetermined time, and multiplexing the demultiplexed time series data bit streams and the reset parameters.

A time series data encoding program according to the present invention causes a computer to perform a processing of compressing and encoding time series data thereby to generate encoded bit streams, a processing of calculating a transition of the amount of data accumulated in a buffer in a virtual decoder defined according to an encoding system, a processing of analyzing the transition of the amount of accumulated data thereby to reset parameters indicating a size of the buffer and the amount of accumulated data in the buffer at a predetermined time, and a processing of multiplexing the generated encoded bit streams and the reset parameters.

A time series data re-encoding program according to the present invention causes a computer to perform a processing of demultiplexing encoded bit streams including operation parameters of a buffer in a virtual decoder defined according to an encoding system, a processing of calculating the amount of data per predetermined time in the demultiplexed time series data bit streams, a processing of calculating a transition of the amount of data accumulated in the buffer in the virtual decoder, a processing of analyzing the transition of the amount of accumulated data thereby to reset parameters indicating a size of the buffer and the amount of accumulated data in the buffer at a predetermined time, and a processing of multiplexing the demultiplexed time series data bit streams and the reset parameters.

Advantageous Effects of Invention

According to the present invention, it is possible to reduce a buffer size required for transmission and a transmission delay without performing a re-compression processing on time series data when transmitting compressed and encoded time series data.

DESCRIPTION OF EMBODIMENTS

First Exemplary Embodiment

A first exemplary embodiment according to the present invention will be described below with reference to the drawings.

A structure and operations of a time series data encoding apparatus (video encoding apparatus) for encoding an input video and outputting bit streams will be described according to the first exemplary embodiment.

Figure 1:
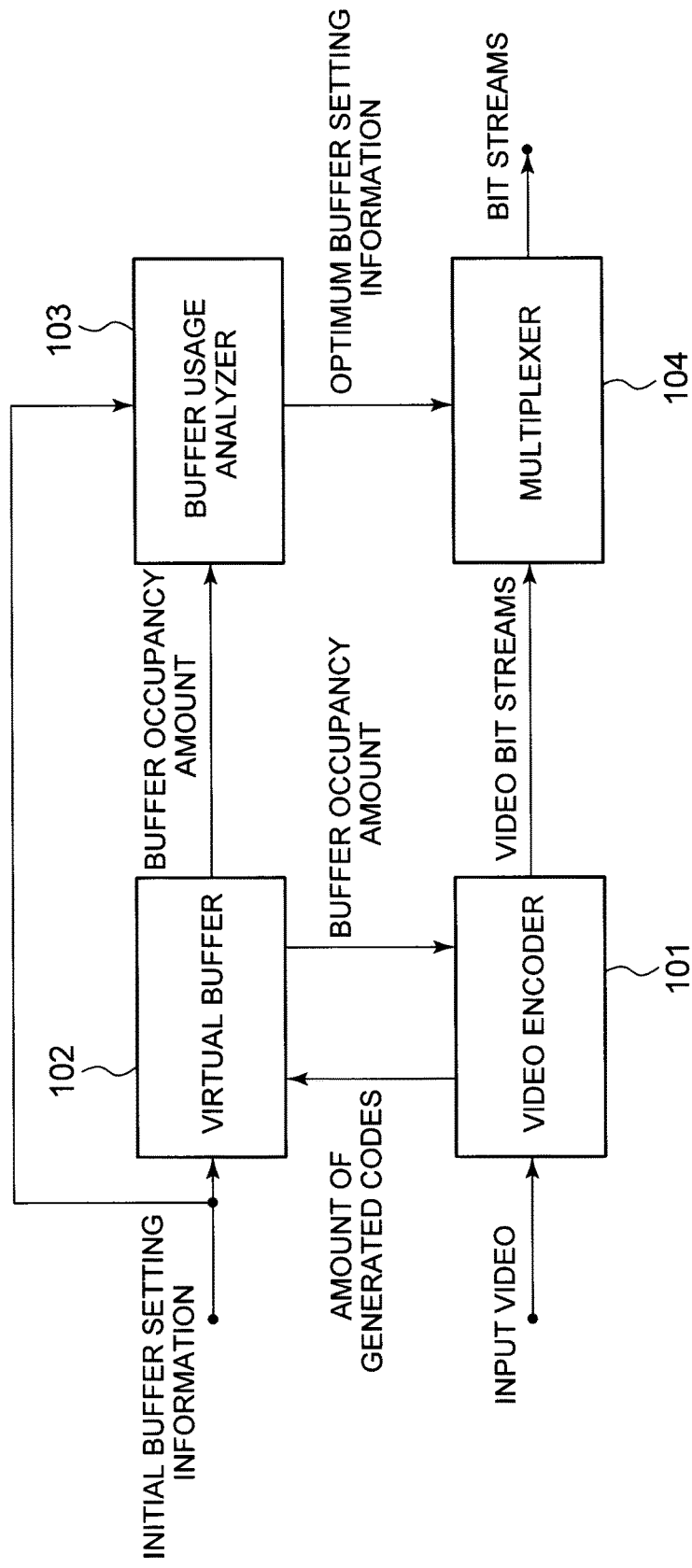
FIG. 1 It depicts a block diagram illustrating a structure of a video encoding apparatus according to a first exemplary embodiment.

FIG. 1 is a block diagram illustrating a structure of the video encoding apparatus according to the first exemplary embodiment. As illustrated in FIG. 1, the video encoding apparatus according to the present exemplary embodiment includes a video encoder 101, a virtual buffer 102, a buffer usage analyzer 103, and a multiplexer 104.

Figure 11:
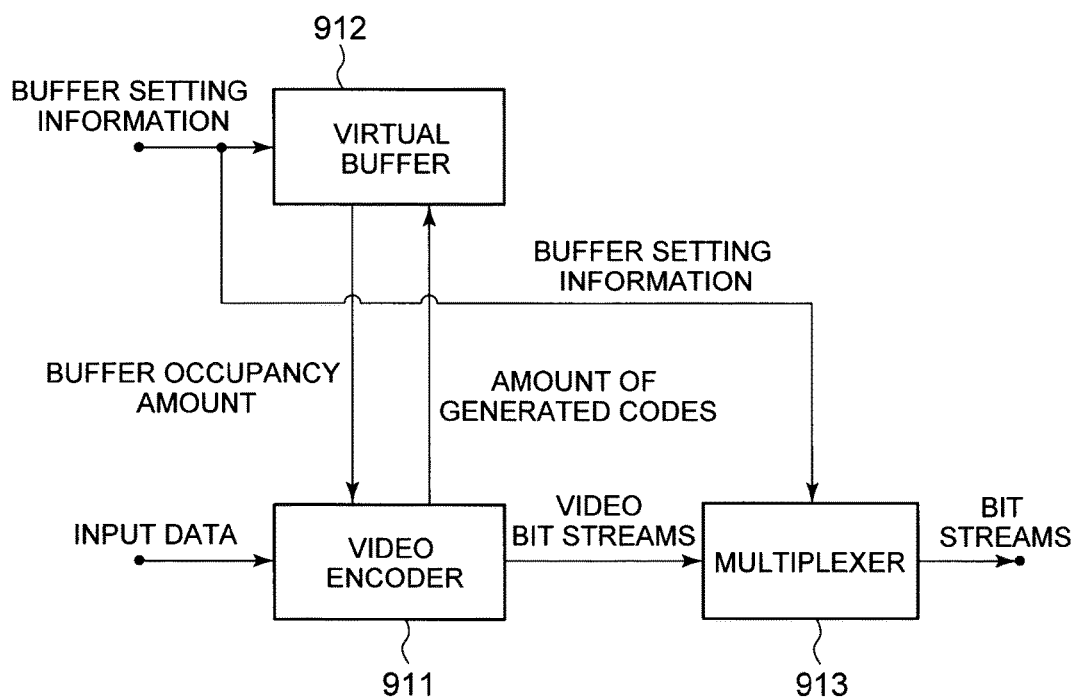
FIG. 11 It depicts a block diagram illustrating an exemplary structure of a typical video encoding apparatus for encoding while monitoring the operations of a virtual buffer.

The video encoding apparatus according to the present exemplary embodiment is different from the video encoding apparatus illustrated in FIG. 11 in that it includes the buffer usage analyzer 103 for analyzing a buffer usage and calculating optimum buffer setting information.

The video encoder 101 encodes each image frame configuring an input video and generates video bit streams while monitoring the operations of the virtual buffer 102. The video encoder 101 supplies the generated video bit streams to the multiplexer 104 and supplies the amount of generated codes to the virtual buffer 102.

The virtual buffer 102 calculates the amount of data accumulated in the buffer (the amount of accumulated data) at each instant of time, or the buffer occupancy amount at each instant of time based on initial buffer setting information including a buffer size and the delay amount of a buffer in a virtual decoder defined depending on an encoding system, and the amount of generated codes supplied from the video encoder 101. The virtual buffer 102 feeds back the calculation result to the video encoder 101, and supplies it also to the buffer usage analyzer 103.

The buffer usage analyzer 103 monitors the operations of the virtual buffer 102 based on the data indicating the calculation result of the buffer occupancy amount supplied from the virtual buffer 102. The buffer usage analyzer 103 then calculates a minimum buffer size required for actual transmission and the minimum delay amount based on a transition of the buffer occupancy amount. The buffer usage analyzer 103 supplies the calculation result as optimum buffer setting information to the multiplexer 104.

The multiplexer 104 encodes the optimum buffer setting information supplied from the buffer usage analyzer 103, multiplexes the encoded optimum buffer setting information on the video bit streams supplied from the video encoder 101, and outputs the multiplexed video bit steams as bit streams.

With the structure, the video encoding apparatus can configure the bit streams to reduce the buffer size required for transmission and the transmission delay. This is because the buffer usage analyzer 103 analyzes a transition of the buffer occupancy amount received from the virtual buffer 102 thereby to calculate the optimum buffer setting information and the multiplexer 104 multiplexes the optimum buffer setting information on the bit streams instead of the initial buffer setting information and transmits the multiplexed bit streams to the video sending apparatus and the video decoding apparatus. That is, the video sending apparatus and the video decoding apparatus can recognize as small buffer size and delay amount as required for transmission.

The video encoder 101, the virtual buffer 102, the buffer usage analyzer 103, and the multiplexer 104 are realized by a computer operating according to a time series data encoding program, for example. In this case, the CPU reads the time series data encoding program, and operates as the video encoder 101, the virtual buffer 102, the buffer usage analyzer 103 and the multiplexer 104 according to the program. Further, the video encoder 101, the virtual buffer 102, the buffer usage analyzer 103, and the multiplexer 104 may be realized in separate hardware.

The operations of the present exemplary embodiment will be described below.

Figure 2:
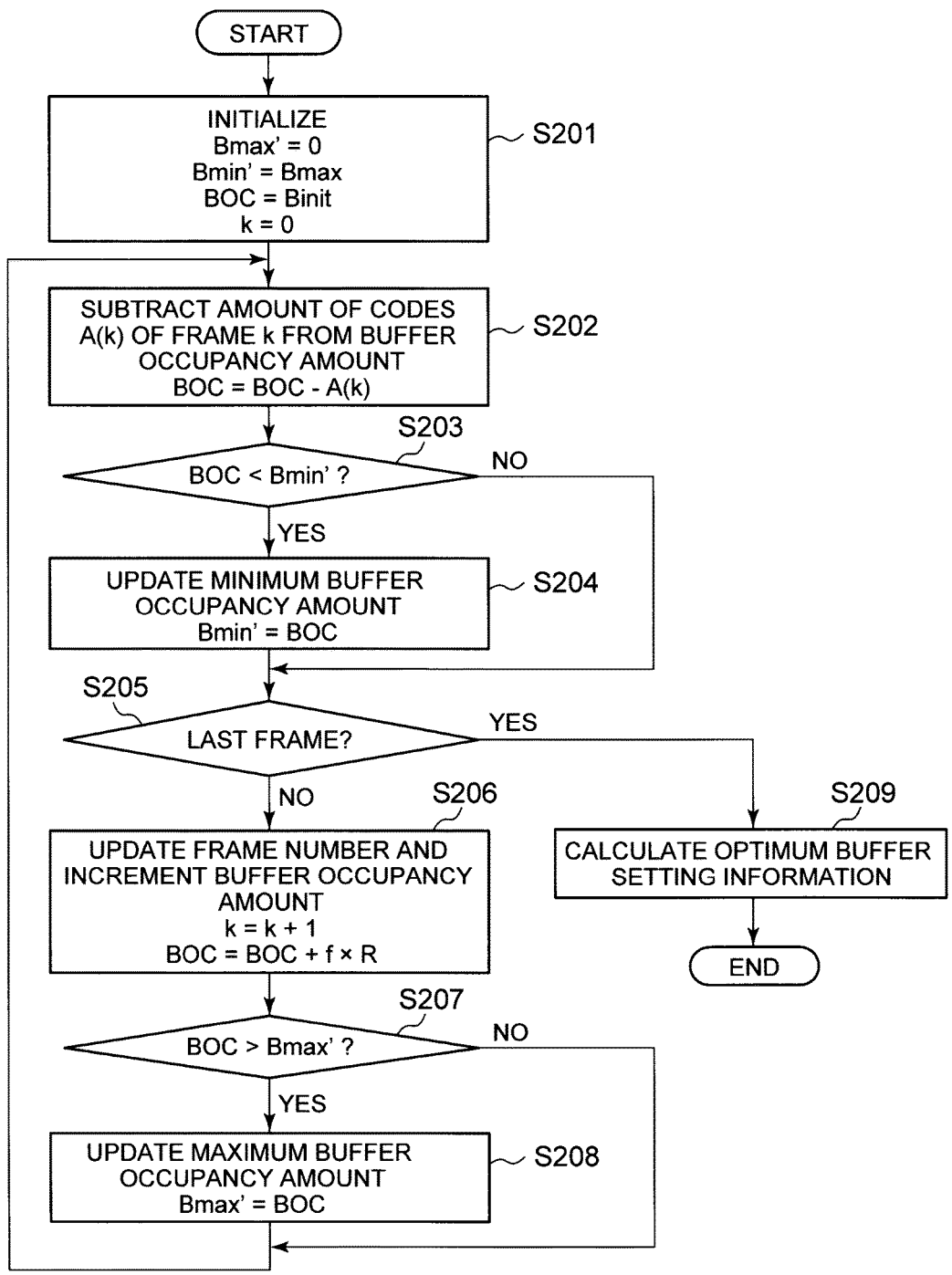
FIG. 2 It depicts a flowchart illustrating an optimum buffer setting information calculation processing in a buffer usage analyzer according to the first exemplary embodiment.

An optimum buffer setting information calculation processing in the buffer usage analyzer 103 will be described herein. FIG. 2 is a flowchart illustrating the optimum buffer setting information calculation processing in the buffer usage analyzer according to the first exemplary embodiment.

As illustrated in FIG. 2, at first, the buffer usage analyzer 103 initializes maximum buffer occupancy amount Bmax', minimum buffer occupancy amount Bmin', buffer occupancy amount BOC, and frame number k (step S201). The buffer usage analyzer 103 sets the maximum buffer occupancy amount Bmax' at 0 as an initial value, and sets the minimum buffer occupancy amount Bmin' at the buffer size Bmax in the initial buffer setting information as an initial value. Further, the buffer usage analyzer 103 sets the buffer occupancy amount BOC at the initial buffer occupancy amount Binit in the initial buffer setting information as an initial value, and sets the frame number k at 0 as an initial value.

The buffer usage analyzer 103 subtracts the amount of codes of a frame k with the frame number k from the current buffer occupancy amount (step S202). Assuming the amount of codes of a frame k as A(k), the buffer occupancy amount is updated in the following Equation (3).

$$BOC=BOC-A(k) \qquad \text{Equation (3)}$$

The buffer usage analyzer 103 determines whether the current buffer occupancy amount BOC lowers the minimum buffer occupancy amount Bmin' (step S203). When the current buffer occupancy amount BOC lowers the minimum buffer occupancy amount Bmin' (YES in step S203), the buffer usage analyzer 103 proceeds to the processing in step S204. When the current buffer occupancy amount BOC does not lower the minimum buffer occupancy amount Bmin' (NO in step S203), the process proceeds to step S205.

In step S204, the buffer usage analyzer 103 updates the value of the minimum buffer occupancy amount Bmin' by the current buffer occupancy amount BOC.

In step S205, the buffer usage analyzer 103 determines whether a current frame is the last frame to be processed. When a current frame is the last frame to be processed (YES in step S205), the buffer usage analyzer 103 proceeds to the processing in step S209. When a current frame is not the last frame to be processed (NO in step S205), the process proceeds to step S206.

In step S206, the buffer usage analyzer 103 increments the frame number by 1. Further, the buffer usage analyzer 103 finds the buffer occupancy amount immediately before the processing of subtracting the amount of codes of a next frame. Assuming an inter-frame time interval as f and a transmission bit rate per unit time as R, the buffer occupancy amount is updated in the following Equation (4).

$$BOC=BOC+f\times R \qquad \text{Equation (4)}$$

The buffer usage analyzer 103 determines whether the current buffer occupancy amount BOC exceeds the maximum buffer occupancy amount Bmax' (step S207). When the current buffer occupancy amount BOC exceeds the maximum buffer occupancy amount Bmax' (YES in step S207), the buffer usage analyzer 103 proceeds to the processing in step S208. When the current buffer occupancy amount BOC does not exceed the maximum buffer occupancy amount Bmax' (NO in step S207), processing returns to the step S202.

In step S208, the buffer usage analyzer 103 updates the value of the maximum buffer occupancy amount Bmax' by the current buffer occupancy amount BOC. The buffer usage analyzer 103 performs the processing in step S208, and then returns to the processing in step S202.

In step S209, the buffer usage analyzer 103 calculates the optimum buffer setting information. Herein, buffer size, initial buffer occupancy amount, and decoding start delay time in the optimum buffer setting information are assumed as Bmax_real, Binit_real, and Dinit_real, respectively. At this time, Bmax_real, Binit_real, and Dinit_real are calculated in the following Equation (5), Equation (6), and Equation (7), respectively.

$$B\text{max\_real}=B\text{max}'-B\text{min}' \qquad \text{Equation (5)}$$

$$B\text{init\_real}=B\text{init}-B\text{min}' \qquad \text{Equation (6)}$$

$$D\text{init\_real}=B\text{init\_real}/R \qquad \text{Equation (7)}$$

When the buffer usage analyzer 103 calculates the optimum buffer setting information, the buffer usage analysis processing is terminated.

The video encoding apparatus (the multiplexer 104, specifically) may encode the optimum buffer setting information calculated by the buffer usage analyzer 103 as auxiliary information according to the rules described in NPL 2, for example, and may multiplex and transmit the encoded optimum buffer setting information on bit streams. Further, the multiplexer 104 may perform the multiplexing per GOP at a random access cycle or in any unit.

As described above, according to the present exemplary embodiment, the buffer usage analyzer 103 analyzes the transition of the buffer occupancy amount received from the virtual buffer 102 thereby to calculate the optimum buffer setting information, and the multiplexer 104 multiplexes the optimum buffer setting information on the bit streams instead of the initial buffer setting information, and transmits the multiplexed bit streams to the video sending apparatus and the video decoding apparatus. Thereby, the video encoding apparatus can cause the video sending apparatus and the video decoding apparatus to recognize as small buffer size and delay amount as required for transmission. Therefore, when transmitting the generated bit streams to the video decoding apparatus via the buffer, the video encoding apparatus can reduce the buffer size required for transmission and the transmission delay without performing the re-compression processing on the video data.

Further, the present exemplary embodiment demonstrates the example in which the buffer usage analyzer 103 calculates the optimum buffer setting information only once. However, the buffer usage analyzer 103 may calculate the optimum buffer setting information several times. For example, the buffer usage analyzer 103 may calculate the buffer occupancy amount and the decoding start delay time at a random access cycle and may output them as the optimum buffer setting information.

Further, the present exemplary embodiment demonstrates the example in which the buffer usage analyzer 103 calculates the optimum buffer setting information by use of both the maximum value and the minimum value of the buffer occupancy amount. However, the buffer usage analyzer 103 may calculate the optimum buffer setting information by use of either the maximum value or the minimum value of the buffer occupancy amount, for example.

The present exemplary embodiment demonstrates the example in which the buffer usage analyzer 103 calculates a transition of the buffer occupancy amount assuming the bit rate R and the inter-frame time interval f as predetermined constants. However, the bit rate R and the inter-frame time interval f may take variable values changing over time, for example.

The present exemplary embodiment demonstrates the example in which the buffer usage analyzer 103 analyzes the buffer occupancy amount per image frame and calculates the optimum buffer setting information. However, the buffer usage analyzer 103 may analyze the buffer occupancy amount per partial image such as slice which is a divided image frame thereby to calculate the optimum buffer setting information.

Second Exemplary Embodiment

A second exemplary embodiment according to the present invention will be described below with reference to the drawings.

A structure and operations of a time series data re-encoding apparatus (video re-encoding apparatus) for re-encoding bit streams in which video bit streams and buffer setting information are multiplexed will be described according to the second exemplary embodiment.

Figure 3:
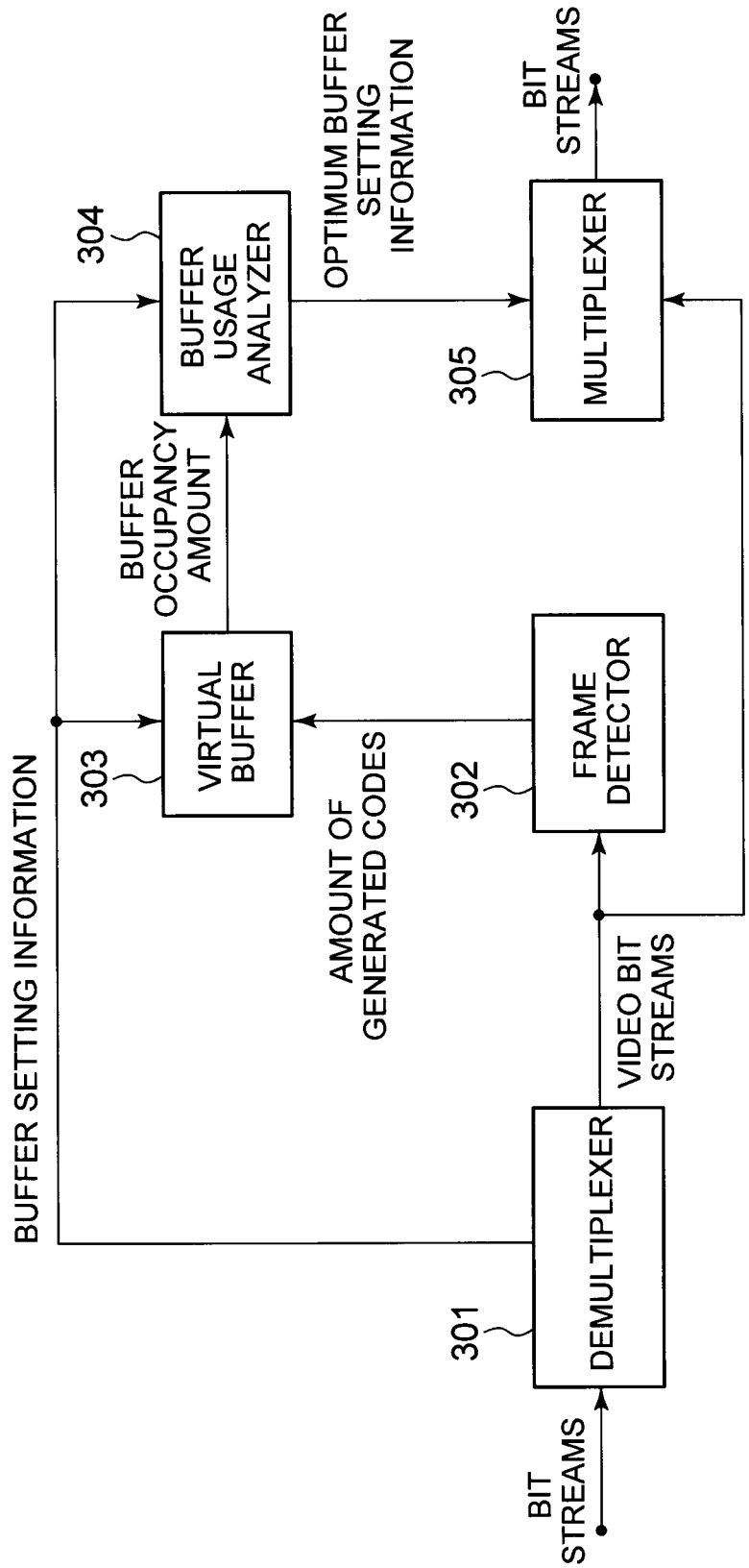
FIG. 3 It depicts a block diagram illustrating a structure of a video re-encoding apparatus according to a second exemplary embodiment.

FIG. 3 is a block diagram illustrating a structure of the video re-encoding apparatus according to the second exemplary embodiment. As illustrated in FIG. 3, the video re-encoding apparatus according to the present exemplary embodiment includes a demultiplexer 301, a frame detector 302, a virtual buffer 303, a buffer usage analyzer 304, and a multiplexer 305. The video re-encoding apparatus according to the present exemplary embodiment is characterized by including the buffer usage analyzer 304 for analyzing a buffer usage thereby to calculate optimum buffer setting information.

The demultiplexer 301 is input with the multiplexed bit streams and demultiplexes the bit streams. That is, the demultiplexer 301 separates the video bit streams and the buffer setting information which are multiplexed. The demultiplexer 301 then supplies the video bit streams to the frame detector 302 and the multiplexer 305. Further, the demultiplexer 301 supplies the buffer setting information to the virtual buffer 303 and the buffer usage analyzer 304.

The frame detector 302 scans the video bit streams supplied from the demultiplexer 301 thereby to detect breaks between groups of data configuring the image frames. The frame detector 302 then calculates the amount of codes per image frame, and supplies the calculation result (the amount of generated codes) to the virtual buffer 303.

The virtual buffer 303 calculates the buffer occupancy amount at each instant of time based on the buffer setting information including the buffer size, the delay amount, and the like supplied from the demultiplexer 301, and the amount of generated codes supplied from the frame detector 302, and supplies the calculated buffer occupancy amount to the buffer usage analyzer 304.

The buffer usage analyzer 304 monitors the operations of the virtual buffer 303 based on the data indicating the calculation result of the buffer occupancy amount supplied from the virtual buffer 303, and calculates optimum buffer setting information based on a transition of the buffer occupancy amount. The buffer usage analyzer 304 then supplies the calculated optimum buffer setting information to the multiplexer 305.

The buffer usage analysis processing in the buffer usage analyzer 304 is the same as the processing in the buffer usage analyzer 103 in the video encoding apparatus according to the first exemplary embodiment, and thus the description thereof will be omitted.

The multiplexer 305 encodes the optimum buffer setting information supplied from the buffer usage analyzer 304, and multiplexes the encoded optimum buffer setting information on the video bit streams supplied from the demultiplexer 301. The multiplexer 305 then outputs the video bit streams multiplexed with the optimum buffer setting information.

With the structure, the video re-encoding apparatus can reconstruct the bit streams to reduce the buffer size required for transmission and the transmission delay without decoding and re-compressing the video bit streams. This is because the buffer usage analyzer 304 analyzes the transition of the buffer occupancy amount received from the virtual buffer 303 thereby to calculate the optimum buffer setting information and the multiplexer 305 multiplexes the optimum buffer setting information on the bit streams instead of the buffer setting information given to the input bit streams and transmits the multiplexed bit streams to the video sending apparatus and the video decoding apparatus. That is, the video sending apparatus and the video decoding apparatus can recognize as small buffer size and delay amount as required for transmission.

The demultiplexer 301, the frame detector 302, the virtual buffer 303, the buffer usage analyzer 304, and the multiplexer 305 are realized by a computer operating according to a time series data re-encoding program, for example. In this case, the CPU reads the time series data re-encoding program, and operates as the demultiplexer 301, the frame detector 302, the virtual buffer 303, the buffer usage analyzer 304, and the multiplexer 305 according to the program. Further, the demultiplexer 301, the frame detector 302, the virtual buffer 303, the buffer usage analyzer 304, and the multiplexer 305 may be realized in separate hardware.

Figure 8:
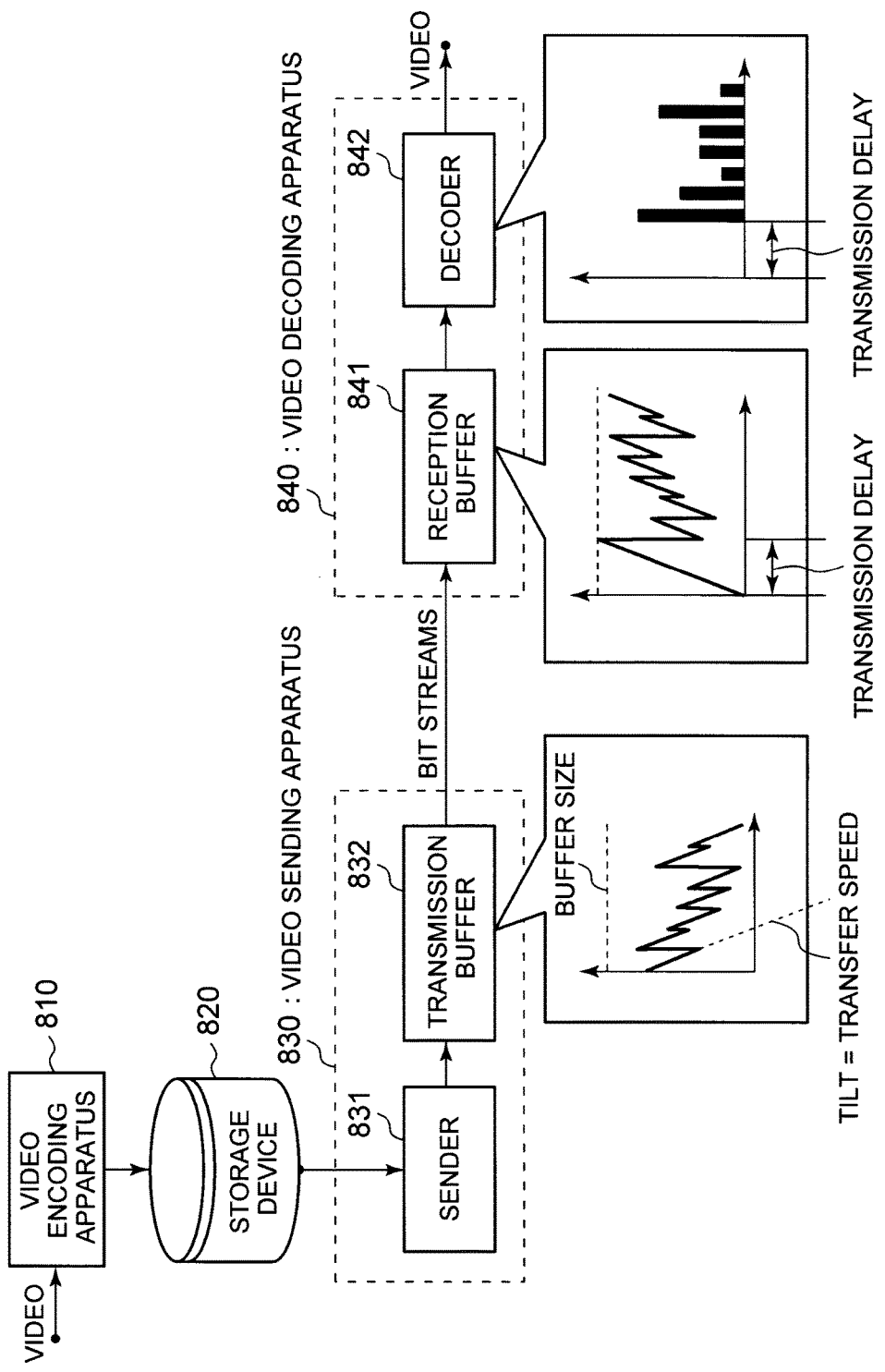
FIG. 8 It depicts a block diagram illustrating an exemplary system including a video encoding apparatus, a video sending apparatus, and a video decoding apparatus.
Figure 9:
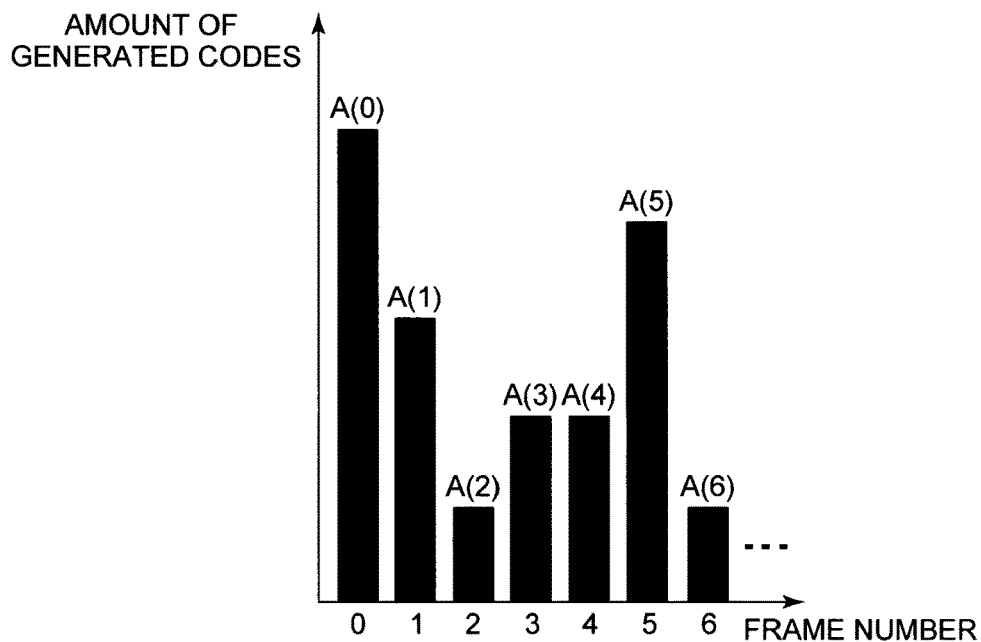
FIG. 9 It depicts an explanatory diagram illustrating the amounts of generated codes per image frame in a bit stream obtained by compressing and encoding a video by way of example.
Figure 10:
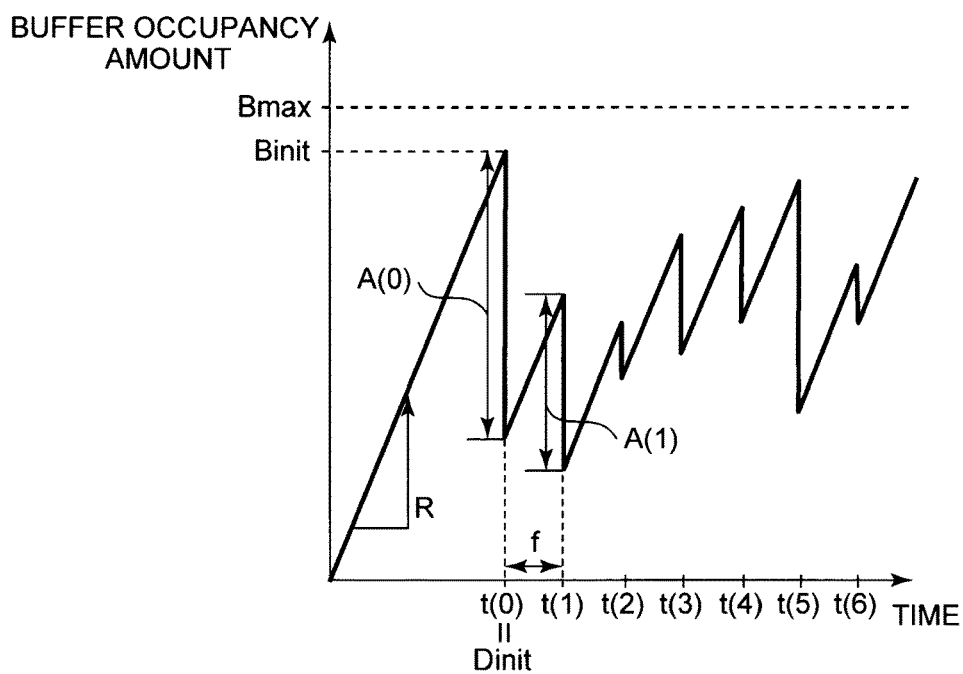
FIG. 10 It depicts an explanatory diagram illustrating an exemplary transition of the buffer occupancy amount in a virtual buffer simulating a reception buffer for inputting bit streams obtained by compressing and encoding a video.

The video re-encoding apparatus according to the present invention is suitably applicable to the video transmission system illustrated in FIG. 8, for example. That is, in the video transmission system illustrated in FIG. 8, the video re-encoding apparatus is arranged between the storage device and the video sending apparatus so that the bit streams accumulated in the storage device can be re-encoded to be optimized before being supplied to the video sending apparatus.

Each exemplary embodiment described above demonstrates a suitable exemplary embodiment according to the present invention, and the present invention is not limited to the above exemplary embodiments. The present invention can be accomplished in variously-modified forms without departing from the scope of the present invention. For example, the present invention is not limited to transmitting video data, and may be applied to transmit speech or any other time series data.

As is clear from the above description, the present invention may be configured in hardware, and may be realized by a computer program.

Figure 4:
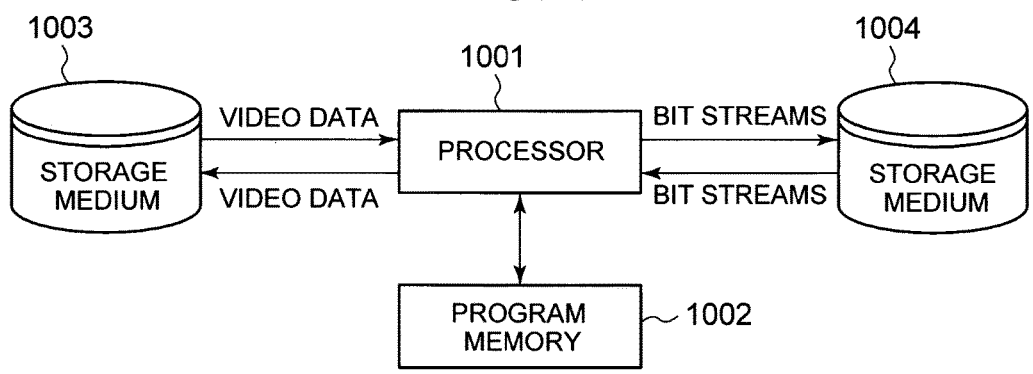
FIG. 4 It depicts a block diagram illustrating an exemplary structure of an information processing system to which the present invention is applied.

FIG. 4 is a block diagram illustrating an exemplary structure of an information processing system to which the present invention is applied. The information processing system illustrated in FIG. 4 includes a processor 1001, a program memory 1002, a storage medium 1003, and a storage medium 1004. The storage medium 1003 and the storage medium 1004 may be separate storage mediums or may be the same storage medium with different storage areas. The storage mediums may employ a magnetic storage medium such as hard disk. In this case, the processor 1001 operating according to a computer program (the time series data encoding program or the time series data re-encoding program) stored in the program memory 1002 realizes the same functions and operations as those in each exemplary embodiment described above. Further, the structure of the information processing system to which the present invention is applied is not limited to the structure illustrated in FIG. 4, and the present invention is enabled by realizing only some functions according to each above-described exemplary embodiment by a computer program.

Figure 5:
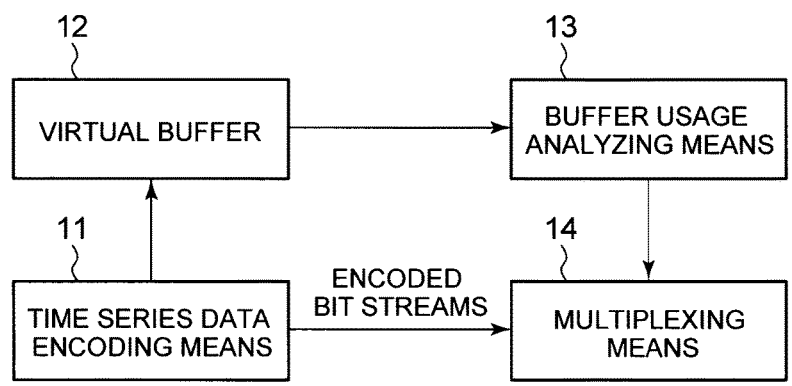
FIG. 5 It depicts a block diagram illustrating a minimum structure of a video encoding apparatus according to the present invention.
Figure 6:
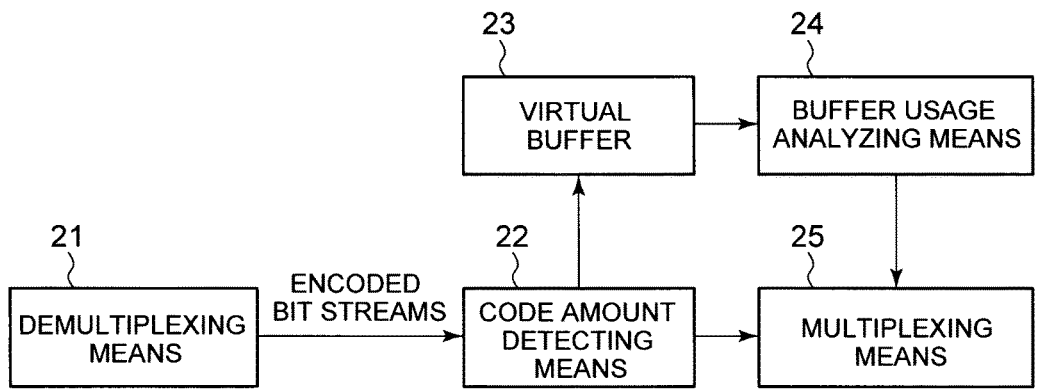
FIG. 6 It depicts a block diagram illustrating a minimum structure of a video re-encoding apparatus according to the present invention.
Figure 7:
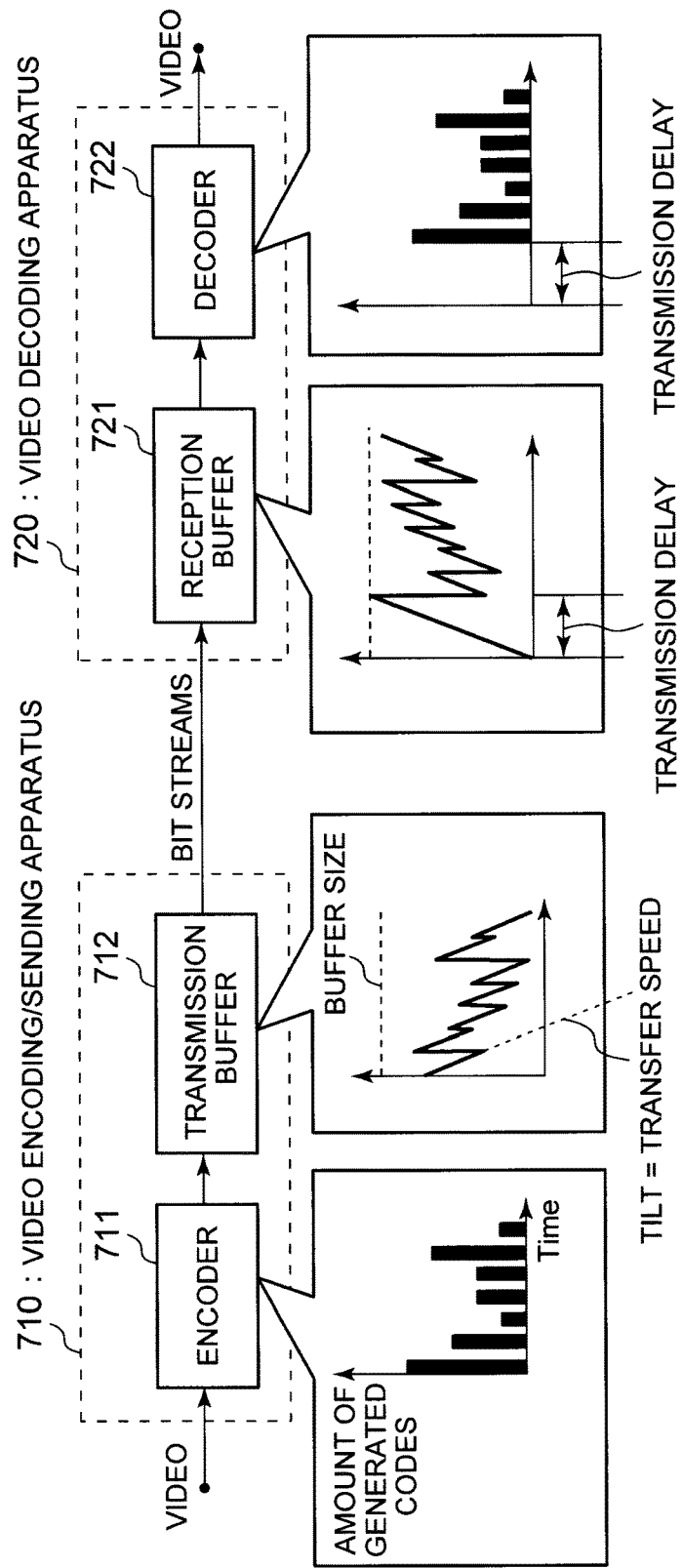
FIG. 7 It depicts a block diagram illustrating an exemplary system including a video encoding/sending apparatus and a video decoding apparatus.

An outline of the present invention will be described below. FIG. 5 is a block diagram illustrating a minimum structure of the time series data encoding apparatus according to the present invention. FIG. 6 is a block diagram illustrating a minimum structure of the time series data re-encoding apparatus according to the present invention.

As illustrated in FIG. 5, the time series data encoding apparatus according to the present invention includes a time series data encoding means 11 (corresponding to the video encoder 101 in the video encoding apparatus illustrated in FIG. 1) which compresses and encodes time series data thereby to generate encoded bit streams, a virtual buffer 12 (corresponding to the virtual buffer 102 in the video encoding apparatus illustrated in FIG. 1) which calculates a transition of the amount of data accumulated in a buffer in a virtual decoder defined according to an encoding system, a buffer usage analyzing means 13 (corresponding to the buffer usage analyzer 103 in the video encoding apparatus illustrated in FIG. 1) which analyzes the transition of the amount of accumulated data thereby to reset parameters indicating a buffer size and the amount of accumulated data in the buffer at a predetermined time, and a multiplexing means 14 (corresponding to the multiplexer 104 in the video encoding apparatus illustrated in FIG. 1) which multiplexes the encoded bit streams generated by the time series data encoding means 11 and the parameters reset by the buffer usage analyzing means 13.

With the structure, the time series data encoding apparatus can cause the video sending apparatus and the video decoding apparatus to recognize as small buffer size and delay amount as required for transmission, for example. Therefore, when transmitting the generated bit streams to the video decoding apparatus or the like via the buffer, the time series data encoding apparatus can reduce the buffer size required for transmission and the transmission delay without performing the re-compression processing on the time series data.

The buffer usage analyzing means 13 may reset the parameters indicating the buffer size and the amount of accumulated data in the buffer at a predetermined time by use of a maximum value and a minimum value of the amount of data accumulated in the buffer in the virtual decoder defined according to an encoding system. With the structure, for example, the amount of accumulated data (the buffer occupancy amount) in the virtual buffer can be calculated at a random access cycle and can be output as optimum buffer setting information. Therefore, the buffer size required for transmission and the transmission delay can be reduced.

The buffer usage analyzing means 13 may subtract the minimum value from the maximum value of the amount of data accumulated in the buffer in the virtual decoder defined according to an encoding system thereby to calculate a value of the reset buffer size, and may subtract the minimum value from the amount of accumulated data in the buffer at a predetermined time thereby to calculate a value of the reset amount of accumulated data in the buffer at a predetermined time. With the structure, the parameters indicating the size of the virtual buffer and the amount of accumulated data in the virtual buffer at a predetermined time can be accurately calculated. Therefore, the buffer size required for transmission and the transmission delay can be accurately reduced.

As illustrated in FIG. 6, the time series data re-encoding apparatus according to the present invention includes a demultiplexing means 21 (corresponding to the demultiplexer 301 in the video re-encoding apparatus illustrated in FIG. 3) which demultiplexes encoded bit streams including operation parameters of a buffer in a virtual decoder defined according to an encoding system, a code amount detecting means 22 (corresponding to the frame detector 302 in the video re-encoding apparatus illustrated in FIG. 3) which calculates the amount of data per predetermined time in the demultiplexed time series data bit streams, a virtual buffer 23 (corresponding to the virtual buffer 303 in the video re-encoding apparatus illustrated in FIG. 3) which calculates a transition of the amount of accumulated in the buffer, a buffer usage analyzing means 24 (corresponding to the buffer usage analyzer 304 in the video re-encoding apparatus illustrated in FIG. 3) which analyzes the transition of the amount of accumulated data thereby to reset the parameters indicating a buffer size and the amount of accumulated data in the buffer at a predetermined time, and a multiplexing means 25 (corresponding to the multiplexer 305 in the video re-encoding apparatus illustrated in FIG. 3) which multiplexes the demultiplexed time series data bit streams and the parameters reset by the buffer usage analyzing means 24.

With the structure, the bit streams can be reconstructed such that the buffer size required for transmission and the transmission delay are reduced without decoding and re-compressing the time series data bit streams.

The buffer usage analyzing means 24 may reset the parameters indicating the buffer size and the amount of accumulated data in the buffer at a predetermined time by use of a maximum value and a minimum value of the amount of data accumulated in the buffer in the virtual decoder defined according to an encoding system. With the structure, for example, the amount of accumulated data (the buffer occupancy amount) in the virtual buffer can be calculated at a random access cycle and can be output as optimum buffer setting information. Therefore, the buffer size required for transmission and the transmission delay can be reduced.

Assuming the maximum value of the amount of data accumulated in the buffer in the virtual decoder defined according to an encoding system as A, the minimum value as B, the buffer size of the virtual decoder defined according to the encoding system as C, and the amount of accumulated data in the buffer at a predetermined time as D, the buffer usage analyzing means 24 may calculate a value of the reset buffer size (or C) in the equation of E=A−B, and may calculate a value of the reset amount of accumulated data (or D) in the buffer at a predetermined time in the equation of F=D−B. With the structure, the set parameters indicating the size of the virtual buffer and the amount of accumulated data in the virtual buffer at a predetermined time can be accurately calculated. Therefore, the buffer size required for transmission and the transmission delay can be accurately reduced.

Part or all of the above exemplary embodiments may be described as in the following supplementary notes, but is not limited to the following.

(Supplementary Note 1)

A time series data encoding apparatus including a time series data encoding means which compresses and encodes time series data thereby to generate encoded bit streams, a virtual buffer which calculates a transition of the amount of data accumulated in a buffer in a virtual decoder defined according to an encoding system, a buffer usage analyzing means which analyzes the transition of the amount of accumulated data thereby to reset parameters indicating a size of the buffer and the amount of accumulated data in the buffer at a predetermined time, and a multiplexing means which multiplexes the encoded bit streams generated by the time series data encoding means and the parameters reset by the buffer usage analyzing means.

(Supplementary Note 2)

The time series data encoding apparatus according to supplementary note 1, wherein the buffer usage analyzing means resets the parameters indicating the size of the buffer and the amount of accumulated data in the buffer at a predetermined time by use of a maximum value and a minimum value of the amount of data accumulated in the buffer in the virtual decoder defined according to an encoding system.

(Supplementary Note 3)

The time series data encoding apparatus according to supplementary note 2, wherein assuming the maximum value of the amount of data accumulated in the buffer in the virtual decoder defined according to an encoding system as A, the minimum value as B, the size of the buffer in the virtual decoder defined according to the encoding system as C, and the amount of accumulated data in the buffer at a predetermined time as D, the buffer usage analyzing means calculates a value of the reset size of the buffer in the equation of E=A−B, and calculates a value of the reset amount of accumulated data in the buffer at a predetermined time in the equation of F=D−B.

(Supplementary Note 4)

The time series data encoding apparatus according to any one of supplementary note 1 to supplementary note 3, wherein the time series data is video data.

With the structure, when transmitting the generated bit streams via the buffer, the time series data encoding apparatus can reduce the buffer size required for transmission and the transmission delay without performing the re-compression processing on the video data.

(Supplementary Note 5)

A time series data re-encoding apparatus including a demultiplexing means which demultiplexes encoded bit streams including operation parameters of a buffer in a virtual decoder defined according to an encoding system, a code amount detecting means which calculates the amount of data per predetermined time in the demultiplexed time series data bit streams, a virtual buffer which calculates a transition of the amount of data accumulated in the buffer, a buffer usage analyzing means which analyzes the transition of the amount of accumulated data in the buffer thereby to reset parameters indicating a size of the buffer and the amount of accumulated data in the buffer at a predetermined time, and a multiplexing means which multiplexes the demultiplexed time series data bit streams and the parameters reset by the buffer usage analyzing means.

(Supplementary Note 6)

The time series data re-encoding apparatus according to supplementary note 5, wherein the buffer usage analyzing means resets the parameters indicating the size of the buffer and the amount of accumulated data in the buffer at a predetermined time by use of a maximum value and a minimum value of the amount of data accumulated in the buffer in the virtual decoder defined according to an encoding system.

(Supplementary Note 7)

The time series data re-encoding apparatus according to supplementary note 6, wherein assuming the maximum value of the amount of data accumulated in the buffer in the virtual decoder defined according to an encoding system as A, the minimum value as B, the size of the buffer in the virtual decoder defined according to the encoding system as C, and the amount of accumulated data in the buffer at a predetermined time as D, the buffer usage analyzing means calculates a value of the reset size of the buffer in the equation of E=A−B, and calculates a value of the reset amount of accumulated data in the buffer at a predetermined time in the equation of F=D−B.

(Supplementary Note 8)

The time series data re-encoding apparatus according to any one of supplementary note 5 to supplementary note 7, wherein the time series data is video data.

With the structure, the bit streams can be reconstructed such that the buffer size required for transmission and the transmission delay are reduced without decoding and re-compressing the video bit streams.

(Supplementary Note 9)

A time series data encoding method including the steps of compressing and encoding time series data thereby to generate encoded bit streams, calculating a transition of the amount of data accumulated in a buffer in a virtual decoder defined according to an encoding system, analyzing the transition of the amount of accumulated data thereby to reset parameters indicating a size of the buffer and the amount of accumulated data in the buffer at a predetermined time, and multiplexing the generated encoded bit streams and the reset parameters.

(Supplementary Note 10)

The time series data encoding method according to supplementary note 9, including the step of resetting the parameters indicating the size of the buffer and the amount of accumulated data in the buffer at a predetermined time by use of a maximum value and a minimum value of the amount of data accumulated in the buffer in the virtual decoder defined according to an encoding system.

(Supplementary Note 11)

The time series data encoding method according to supplementary note 10, including the step of, assuming the maximum value of the amount of data accumulated in the buffer in the virtual decoder defined according to an encoding system as A, the minimum value as B, the size of the buffer in the virtual decoder defined according to the encoding system as C, and the amount of accumulated data in the buffer at a predetermined time as D, calculating a value of the reset size of the buffer in the equation of E=A−B and calculating a value of the reset amount of accumulated data in the buffer at a predetermined time in the equation of F=D−B.

(Supplementary Note 12)

The time series data encoding method according to any one of supplementary note 9 to supplementary note 11, wherein the time series data is video data.

(Supplementary Note 13)

A time series data re-encoding method including the steps of demultiplexing encoded bit streams including operation parameters of a buffer in a virtual decoder defined according to an encoding system, calculating the amount of data per predetermined time in the demultiplexed time series data bit streams, calculating a transition of the amount of data accumulated in the buffer in the virtual decoder, analyzing the transition of the amount of accumulated data thereby to reset parameters indicating a size of the buffer and the amount of accumulated data in the buffer at a predetermined time, and multiplexing the demultiplexed time series data bit streams and the reset parameters.

(Supplementary Note 14)

The time series data re-encoding method according to supplementary note 13, including the step of resetting the parameters indicating the size of the buffer and the amount of accumulated data in the buffer at a predetermined time by use of a maximum value and a minimum value of the amount of data accumulated in the buffer in the virtual decoder defined according to an encoding system.

(Supplementary Note 15)

The time series data re-encoding method according to supplementary note 14, including the step of, assuming the maximum value of the amount of data accumulated in the buffer in the virtual decoder defined according to an encoding system as A, the minimum value as B, the size of the buffer in the virtual decoder defined according to the encoding system as C, and the amount of accumulated data in the buffer at a predetermined time as D, calculating a value of the reset size of the buffer in the equation of E=A−B and calculating a value of the reset amount of accumulated data in the buffer at a predetermined time in the equation of F=D−B.

(Supplementary Note 16)

The time series data re-encoding method according to any one of supplementary note 13 to supplementary note 15, wherein the time series data is video data.

(Supplementary Note 17)

A time series data encoding program for causing a computer to perform a processing of compressing and encoding time series data thereby to generate encoded bit streams, a processing of calculating a transition of the amount of data accumulated in a buffer in a virtual decoder defined according to an encoding system, a processing of analyzing the transition of the amount of accumulated data thereby to reset parameters indicating a size of the buffer and the amount of accumulated data in the buffer at a predetermined time, and a processing of multiplexing the generated encoded bit streams and the reset parameters.

(Supplementary Note 18)

The time series data encoding program according to supplementary note 17, the program for causing a computer to perform a processing of resetting the parameters indicating the size of buffer and the amount of accumulated data in the buffer at a predetermined time by use of a maximum value and a minimum value of the amount of data accumulated in the buffer in the virtual decoder defined according to an encoding system.

(Supplementary Note 19)

The time series data encoding program according to supplementary note 18, the program for causing a computer to perform a processing of, assuming the maximum value of the amount of data accumulated in the buffer in the virtual decoder defined according to an encoding system as A, the minimum value as B, the size of the buffer in the virtual decoder defined according to the encoding system as C, and the amount of accumulated data in the buffer at a predetermined time as D, calculating a value of the reset size of the buffer in the equation of E=A−B and calculating a value of the reset amount of accumulated data in the buffer at a predetermined time in the equation of F=D−B.

(Supplementary Note 20)

The time series data encoding program according to any one of supplementary note 17 to supplementary note 19, wherein the time series data is video data.

(Supplementary Note 21)

A time series data re-encoding program for causing a computer to perform a processing of demultiplexing encoded bit streams including operation parameters of a buffer in a virtual decoder defined according to an encoding system, a processing of calculating the amount of data per predetermined time in the demultiplexed time series data bit streams, a processing of calculating a transition of the amount of data accumulated in the buffer in the virtual decoder, a processing of analyzing the transition of the amount of accumulated data thereby to reset parameters indicating a size of the buffer and the amount of accumulated data in the buffer at a predetermined time, and a processing of multiplexing the demultiplexed time series data bit streams and the reset parameters.

(Supplementary Note 22)

The time series data re-encoding program according to supplementary note 21, the program for causing a computer to perform a processing of resetting the parameters indicating the size of the buffer and the amount of accumulated data in the buffer at a predetermined time by use of a maximum value and a minimum value of the amount of data accumulated in the buffer in the virtual decoder defined according to an encoding system.

(Supplementary Note 23)

The time series data re-encoding program according to supplementary note 22, the program for causing a computer to perform a processing of, assuming the maximum value of the amount of data accumulated in the buffer in the virtual decoder defined according to an encoding system as A, the minimum value as B, the size of the buffer in the virtual decoder defined according to the encoding system as C, and the amount of accumulated data in the buffer at a predetermined time as D, calculating a value of the reset size of the buffer in the equation of E=A−B and calculating a value of the reset amount of accumulated data in the buffer at a predetermined time in the equation of F=D−B.

(Supplementary Note 24)

The time series data re-encoding program according to any one of supplementary note 21 to supplementary note 23, wherein the time series data is video data.

The present invention has been described above with reference to the exemplary embodiments and the examples, but the present invention is not limited to the exemplary embodiments and the examples. The structure and details of the present invention can be variously modified within the scope of the present invention understandable by those skilled in the art.

The present application claims the priority based on Japanese Patent Application No. 2013-119853 filed on Jun. 6, 2013, the disclosure of which is all incorporated herein by reference.

| Reference Signs List | |
| --- | --- |
| 11 | Time series data encoding means |
| 12 | Virtual buffer |
| 13 | Buffer usage analyzing means |
| 14 | Multiplexing means |
| 21 | Demultiplexing means |
| 22 | Code amount detecting means |
| 23 | Virtual buffer |
| 24 | Buffer usage analyzing means |
| 25 | Multiplexing means |
| 101, 911 | Video encoder |
| 102, 912 | Virtual buffer |
| 103 | Buffer usage analyzer |
| 104, 913 | Multiplexer |
| 301 | Demultiplexer |
| 302 | Frame detector |
| 303 | Virtual buffer |
| 304 | Buffer usage analyzer |
| 305 | Multiplexer |
| 710 | Video encoding/sending apparatus |
| 711 | Encoder |
| 712 | Transmission buffer |
| 720, 840 | Video decoding apparatus |
| 721, 841 | Reception buffer |
| 722, 842 | Decoder |
| 810 | Video encoding apparatus |
| 820 | Storage device |
| 830 | Video sending apparatus |
| 831 | Sender |
| 832 | Transmission buffer |
| 1001 | Processor |
| 1002 | Program memory |
| 1003, 1004 | Storage medium |

What is claimed is:

1. A time series data encoding apparatus comprising: hardware including a processor;

a time series data encoding unit implemented at least by the hardware and which compresses and encodes time series data thereby to generate encoded bit streams;

a virtual buffer implemented at least by the hardware and which calculates a transition of the amount of data accumulated in a buffer in a virtual decoder defined according to an encoding system;

a buffer usage analyzing unit implemented at least by the hardware and which analyzes the transition of the amount of accumulated data in a predetermined interval thereby to reset parameters indicating a size of the buffer and the amount of accumulated data in the buffer at a predetermined time; and a multiplexing unit implemented at least by the hardware and which multiplexes the encoded bit streams generated by the time series data encoding unit and the parameters reset by the buffer usage analyzing unit, wherein the buffer usage analyzing unit calculates, using an initial value indicating the state of the virtual buffer at the head of a predetermined interval and the amount of accumulated data output from the virtual buffer at each time within a predetermined interval, at least one of a maximum value and a minimum value of the amount of accumulated data in the predetermined interval, and calculates reset value of the parameters indicating a size of the buffer and the amount of accumulated data in the buffer at a predetermined time by using at least one of the maximum value and the minimum value, and wherein the buffer usage analyzing unit calculates decoding start delay time based on the calculated parameters and a transmission bit rate per unit time.

2. The time series data encoding apparatus according to claim 1, wherein assuming the maximum value of the amount of data accumulated in the buffer in the virtual decoder defined according to an encoding system as A, the minimum value as B, the size of the buffer in the virtual decoder defined according to the encoding system as C, the amount of accumulated data in the buffer at a predetermined time as D, a value of the reset size of the buffer as E, and a value of the reset amount of accumulated data in the buffer at a predetermined time as F, the buffer usage analyzing unit calculates the value of the reset size of the buffer in the equation of $E=A-B$, and calculates the value of the reset amount of accumulated data in the buffer at a predetermined time in the equation of $F=D-B$.

3. A time series data re-encoding apparatus comprising:
hardware including a processor;
a demultiplexing unit implemented at least by the hardware and which demultiplexes encoded bit streams including operation parameters of a buffer in a virtual decoder defined according to an encoding system;
a code amount detecting unit implemented at least by the hardware and which calculates the amount of data per predetermined time in the demultiplexed time series data bit streams;
a virtual buffer implemented at least by the hardware and which calculates a transition of the amount of data accumulated in the buffer;
a buffer usage analyzing unit implemented at least by the hardware and which analyzes the transition of the amount of accumulated data in a predetermined interval thereby to reset parameters indicating a size of the buffer and the amount of accumulated data in the buffer at a predetermined time; and a multiplexing unit implemented at least by the hardware and which multiplexes the demultiplexed time series data bit streams and the parameters reset by the buffer usage analyzing unit, wherein the buffer usage analyzing unit calculates, using an initial value indicating the state of the virtual buffer at the head of a predetermined interval and the amount of accumulated data output from the virtual buffer at each time within a predetermined interval, at least one of a maximum value and a minimum value of the amount of accumulated data in the predetermined interval, and calculates reset value of the parameters indicating a size of the buffer and the amount of accumulated data in the buffer at a predetermined time by using at least one of the maximum value and the minimum value, and wherein the buffer usage analyzing unit calculates decoding start delay time based on the calculated parameters and a transmission bit rate per unit time.

4. The time series data re-encoding apparatus according to claim 3, wherein assuming the maximum value of the amount of data accumulated in the buffer in the virtual decoder defined according to an encoding system as A, the minimum value as B, the size of the buffer in the virtual decoder defined according to the encoding system as C, the amount of accumulated data in the buffer at a predetermined time as D, a value of the reset size of the buffer as E, and a value of the reset amount of accumulated data in the buffer at a predetermined time as F, the buffer usage analyzing unit calculates the value of the reset size of the buffer in the equation of $E=A-B$, and calculates the value of the reset amount of accumulated data in the buffer at a predetermined time in the equation of $F=D-B$.

5. A time series data encoding method comprising:
compressing and encoding time series data thereby to generate encoded bit streams;
calculating a transition of the amount of data accumulated in a buffer in a virtual decoder defined according to an encoding system;
analyzing the transition of the amount of accumulated data in a predetermined interval thereby to reset parameters indicating a size of the buffer and the amount of accumulated data in the buffer at a predetermined time; and
multiplexing the generated encoded bit streams and the reset parameters,
wherein calculating, using an initial value indicating the state of the virtual buffer at the head of a predetermined interval and the amount of accumulated data output from the virtual buffer at each time within a predetermined interval, at least one of a maximum value and a minimum value of the amount of accumulated data in the predetermined interval, and
calculating reset value of the parameters indicating a size of the buffer and the amount of accumulated data in the buffer at a predetermined time by using at least one of the maximum value and the minimum value,
calculating decoding start delay time based on the calculated parameters and a transmission bit rate per unit time.

6. The time series data encoding apparatus according to claim 1, wherein the time series data is video data.

7. The time series data re-encoding apparatus according to claim 3, wherein the time series data is video data.

8. The time series data encoding method according to claim 5, comprising:

assuming the maximum value of the amount of data accumulated in the buffer in the virtual decoder defined according to an encoding system as A, the minimum value as B, the size of the buffer in the virtual decoder defined according to the encoding system as C, the amount of accumulated data in the buffer at a predetermined time as D, a value of the reset size of the buffer as E, and a value of the reset amount of accumulated data in the buffer at a predetermined time as F, calculating the value of the reset size of the buffer in the equation of E=A−B and calculating the value of the reset amount of accumulated data in the buffer at a predetermined time in the equation of F=D−B.

9. The time series data encoding method according to claim 5, wherein the time series data is video data.

\* \* \* \* \*